United States Patent [19]
Usher et al.

[11] Patent Number: 6,139,180
[45] Date of Patent: Oct. 31, 2000

[54] METHOD AND SYSTEM FOR TESTING THE ACCURACY OF A THERMOCOUPLE PROBE USED TO MEASURE THE TEMPERATURE OF MOLTEN STEEL

[75] Inventors: John D. Usher, Beaver Falls; Todd A. Kirkpatrick, New Kensington, both of Pa.

[73] Assignee: Vesuvius Crucible Company, Wilmington, Del.

[21] Appl. No.: 09/049,154

[22] Filed: Mar. 27, 1998

[51] Int. Cl.$^7$ .................................................. G01K 15/00
[52] U.S. Cl. ........................................................... 374/1
[58] Field of Search .............................. 374/1, 139, 140, 374/179; 702/99

[56] References Cited

U.S. PATENT DOCUMENTS

| | | | |
|---|---|---|---|
| 4,058,975 | 11/1977 | Gilbert et al. | 374/163 |
| 4,133,036 | 1/1979 | Watson | 374/107 |
| 4,137,710 | 2/1979 | Preti et al. | 60/223 |
| 4,246,641 | 1/1981 | Babil et al. | 374/1 |
| 4,279,151 | 7/1981 | Anderson | 374/140 |
| 4,627,740 | 12/1986 | Jerde et al. | 374/1 |
| 4,841,286 | 6/1989 | Kummer . | |
| 4,901,257 | 2/1990 | Chang et al. | 374/1 |
| 5,024,801 | 6/1991 | Impink, Jr. et al. . | |
| 5,496,450 | 3/1996 | Blumenthal et al. . | |
| 5,549,280 | 8/1996 | Kings et al. . | |
| 5,566,091 | 10/1996 | Schricker et al. . | |
| 5,703,342 | 12/1997 | Hoffman et al. | 374/1 |

FOREIGN PATENT DOCUMENTS

| | | | |
|---|---|---|---|
| 3006669 | 8/1981 | Germany . | |
| 42 26 082 A1 | 2/1994 | Germany . | |
| 004315386 | 11/1994 | Germany | 374/1 |
| 2106246 | 4/1983 | United Kingdom | 374/107 |
| 094027124 | 11/1994 | WIPO | 374/1 |

OTHER PUBLICATIONS

Yang, Januce C.Y., et al., "A Self Validating Thermocouple," IEEE Transactions on Control Systems Technology, 5(2), Mar. 1, 1997, 239–53.

Hashemian, H.M., et al., "In Situ Response Time Testing of Thermocouples," ISA Transactions, 29(4), Jan. 1, 1990, 97–104.

Skripnick, Yu. A., et al., "Methods for Checking Thermoelectric Thermometers," Measurement Techniques, 35(12), Dec. 1, 1992, 1411–16.

Kuznetsov, V.A., "Prediction of Changes in the Metrological Characteristics of Channels with Sensors," Measurement Techniques, 37(11), Nov. 1, 1994, 1217–19.

Herzog, H., Temperaturmessung mit Thermoelement und Elektronischem Messumformer, Regelungs–Technische Praxis., vol. 24, No. 3, Mar., 1982, pp. 83–89, XP002108143.

*Primary Examiner*—Adolf Deneke Berhane
*Assistant Examiner*—Pia Tibbits
*Attorney, Agent, or Firm*—James R. Williams

[57] ABSTRACT

A method and system for testing the accuracy of a thermocouple probe exposed to a medium having a temperature of between about 2200° F. and 3400° F. is provided that includes the step of measuring the rate of change of the temperature readings of the probe after a temperature of at least 2000° F. is read, and comparing the measured rate of change with a standard rate of change obtained from a properly operating probe. Both the method and the system are advantageously capable of determining whether the temperature readings of a thermocouple in use in a steel production plant are accurate without the need for comparative readings from other thermocouple probes.

20 Claims, 3 Drawing Sheets

METHOD AND SYSTEM FOR TESTING THE ACCURACY OF A THERMOCOUPLE PROBE USED TO MEASURE THE TEMPERATURE OF MOLTEN STEEL

BACKGROUND OF THE INVENTION

This invention generally concerns a method and system for testing the accuracy of a thermocouple probe used to measure the temperature of a molten metal, such as steel, in a continuing casting operation.

Probes (such as Accumetrix® probes manufactured by Vesuvius Crucible Company) for monitoring temperature conditions in metallurgical processes such as steel casting are widely used in the prior art. These probes typically comprise a thermocouple formed from a junction of platinum and rhodium wires encased in a protective ceramic jacket. An example of such a device is the Accumetrix® probe manufactured and sold by the Vesuvius Crucible Company located in Pittsburgh, Pa. In operation, such probes may be inserted into molten steel contained within the tundish of a continuous casting machine. The thermocouple generates a millivolt potential that is converted into a temperature reading by a voltmeter. Because the physical properties of the resulting steel products are largely dependent upon the degree of superheat of the molten steel before solidification, it is critical that the temperature of the steel in the tundish by measured both reliably and accurately.

Systems for determining the reliability of the millivolt output of a thermocouple in a steel-fabricating environment are known in the prior art. U.S. Pat. No. 5,549,820 assigned to the Vesuvius Crucible Company describes and claims a system for determining whether or not the electrical output of a thermocouple probe is spurious due to, for example, a bad connection somewhere in the signal transmission circuit. This particular system works by continuously monitoring the impedance of the thermocouple loop circuit during the operation of the thermocouple, thereby allowing it to detect the advent of a spurious signal immediately upon its occurrence during the steel casting operation. However, as useful as such a system is in determining the electrical integrity of the thermocouple loop circuit, it cannot determine the point in time when the accuracy of the temperature reading first begins to drift or deteriorate near the end of the life of the thermocouple. But before this particular shortcoming of the prior art can be fully appreciated, both the structure and operation of the thermocouple probes used in steel making plants must be understood in greater detail.

The thermocouple probes used to measure the temperature of molten steel in a tundish generally comprise a "hot" junction of rhodium and platinum type B wires that generate a voltage when heated due to the dissimilarity of the metals at the junction. The platinum and rhodium wires leading away from the hot junction are disposed within separate bores in an electrically insulative rod that is covered by an inner alumina sheath. The alumina sheath is in turn covered by an outer molybdenum sheath due to molybdenum's high melting point and excellent thermal shock resistance. In use, the hot junction end of the molybdenum covered probe is inserted within a refractory protector tube immersed in the molten steel. After the hot junction end of the probe has obtained thermal equilibrium with the surrounding molten steel through the walls of the protector tube, the resulting millivolt output is measured and converted into a temperature.

Over time, the temperature readings of the probe will begin to drift away from an accurate measurement. Such drift may occur slowly as a result of either a natural aging process, wherein platinum and rhodium atoms diffuse into one another at the hot junction, or more quickly as a result of the inadvertent bending of the probe by the system operator after removal from the protector tube. Such bending is made possible by the fact that molybdenum becomes ductile at temperatures above 1850° F., thus rendering the thermocouple assembly quite flexible. If the bending is severe enough to break the inner, double-bore alumina insulator, the inventors have observed that the combination of localized stresses and "line of sight" exposure of the bent thermocouple wires to the molybdenum sheath forms a contamination zone on the wires that act as a secondary thermocouple whose output subtracts from the millivolt output of the hot junction at the head of the thermocouple, thereby degrading the accuracy of the temperature reading inferred from the net millivolt output. The applicants have also observed that the secondary subtractive voltage generated by the contaminated zones increases fairly rapidly with time and also with temperature, ultimately rendering the probe completely useless.

Of course, a higher degree of accuracy could be obtained by replacing the thermocouple probe after a one-time use in a particular tundish of steel. But, such a solution would be expensive, as the platinum/rhodium junction and molybdenum sheath used in such probes is costly. Alternatively, the probe could be tested between tundishes by reheating in a device with a known flame temperature. But such testing would be impractical in a typical steel casting operation and would add significantly to the cost of temperature measurement. Additionally, such tests would not tell the operator the exact time that the probe became inaccurate. For this reason, the present solution favored by the prior art is the use of a second "reference" thermocouple probe to verify the results obtained by an in-use thermocouple probe. But once again, such a solution is expensive as it requires the use of two relatively costly temperature sensing components, both of which have a limited lifetime due to the harsh environment imposed by molten steel.

Clearly, there is a need for a method and system for verifying the reliability of the temperature readings of a thermocouple probe which allows the probe to be reused, and continually monitors the accuracy of the probe during use, but does not require the use of a verifying, second probe. Ideally, such a system and method would be compatible for use with existing thermocouple probes without the development or installation of expensive new components. Finally, such a method and system would be sensitive enough to detect the occurrence of inaccurate temperature readings as soon as they begin even when the probe is in use in a pool of molten steel.

SUMMARY OF THE INVENTION

Generally speaking, the invention is both a method and a system for testing the accuracy of a temperature probe exposed to a medium, such as liquid steel, having a temperature of between about 2200° F. and 3400° F. that overcomes all the aforementioned shortcomings. In the method of the invention, the rate of change of the temperature readings of the temperature probe is measured after the probe reads a temperature of at least 2000° F. during initial heat-up from ambient temperature. Next, the measured rate of change is compared with a standard rate of change obtained from a properly operating probe. Any significant difference between the measured and the standard rate of change is indicative of an inaccurate, defective probe.

The method is particularly adapted for use in testing the accuracy of thermocouple probes disposed in ceramic and molybdenum sheaths that are used to measure the temperature of liquid steel which typically has a value of between about 2700° F. and 3000° F. In the preferred method of the invention, the rate of change of the temperature readings is measured from at least about the last 500° F. of an expected final temperature, and more preferably from the last 300° F. Hence, if the expected maximum temperature reading is on the order of 2800° F. to 2900° F., the temperature readings are measured from a temperature of about 2500° F. to 2600° F.

The method may be implemented by an adaptation of a classical response time lag equation of a temperature measuring system where a displayed temperature expressed as $T=T_1-(T_1-T_0)e^{-t/\tau}$, where t equals the number of seconds after the temperature of the medium changes from $T_0$ to $T_1$, and the Greek symbol $\tau$ is a constant that is dependent upon the thermal lag properties of the measuring system. In the subject invention, the rate of change is measured and a value of $\tau$ periodically computed from the expression $$T=T_1-(T_1-T_0)e^{-t/\tau}$$

where T equals the temperature displayed by the probe t seconds after a previous temperature reading of $T_0$ while the medium surrounding the probe is at a temperature $T_1$ (i.e., when filling an empty tundish). In the preferred method, the incremental values of $\tau$ are computed at 30 second intervals or less after T equals at least 2000° F.

The accuracy of the temperature measurements made by the probe being tested may be determined by comparing the measured rate of temperature change with a standard rate of temperature change based on a constant or slightly declining value of $\tau$ as the probe temperature approaches that of the surrounding medium. A constant or slightly declining value of $\tau$ indicates a properly operating probe, whereas an increasing value of $\tau$ indicates a defective, inaccurate probe.

The system of the invention includes a microprocessor that receives the probe output signal over time. The microprocessor implements the method of the invention by computing $\tau$ at 30 second intervals or less by tracking the rate of increase in temperature, and preferably includes a graphical display of the value of $\tau$ over time versus the standard reference value of $\tau$ obtained from a properly operating probe. Both the method and the system of the invention advantageously allow the accuracy of a probe to be periodically tested during its normal operation in a steel casting operation without the need for simultaneous readings by other temperature probes. Installation of the microprocessor is easily implemented by a straightforward connection to the standard Level 1 PLC control system that is now a standard part of all continuous casting operations.

BRIEF DESCRIPTION OF THE SEVERAL FIGURES

DETAILED DESCRIPTION OF THE PREFERRED EMBODIMENT

Figure 1:
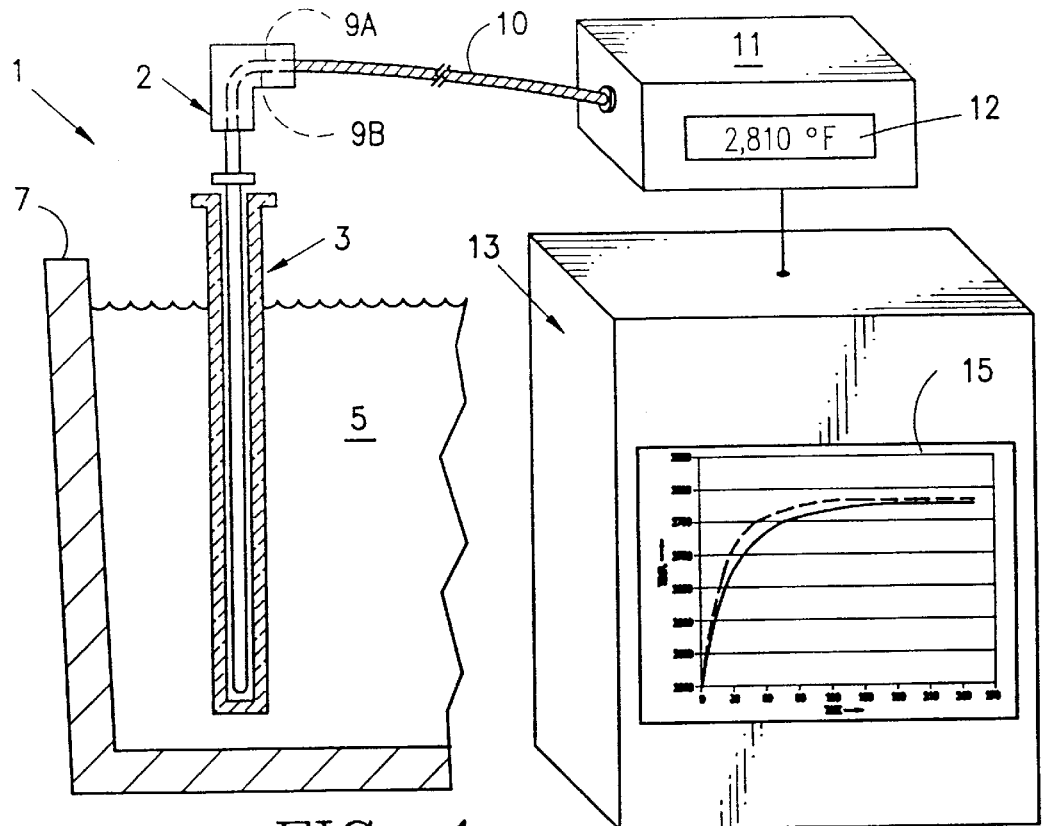
FIG. 1 is a schematic diagram of the probe system used in implementing the method of the invention.

With reference now to FIG. 1, the system 1 carrying out the method of the invention generally comprises a rod-like thermocouple probe 2 disposed in a protective ceramic jacket 3 submerged in a molten metal 5 such as steel contained within a tundish 7. Output leads 9a,b from the thermocouple probe 2 are connected to a temperature indicator 11 of the type well known in the prior art having circuitry for converting the millivolt output of the probe 1 into a temperature and displaying it via a liquid crystal or LED display panel 12 as shown. The system 1 further includes a microprocessor 13 having an input connected to the temperature indicator 11 for generating a graph of the temperature sensed by the probe 2 over time (or the $\tau$ value over time as explained hereinafter) and displaying the resulting graph via an appropriate CRT or LED display panel 15. Microprocessor 13 further includes sufficient memory and processing capacity to store and compare the temperature versus time graphs generated by one or more thermocouple probes 2 over a multitude of steel casting cycles. In the preferred embodiment, the system 1 may be an Accumetrix® type continuous temperature measurement system of the type including a rod-like thermocouple probe, protective ceramic jacket, various temperature indicators, and microprocessor manufactured by the Vesuvius Crucible Company located in Pittsburgh, Pa.

Figure 2:
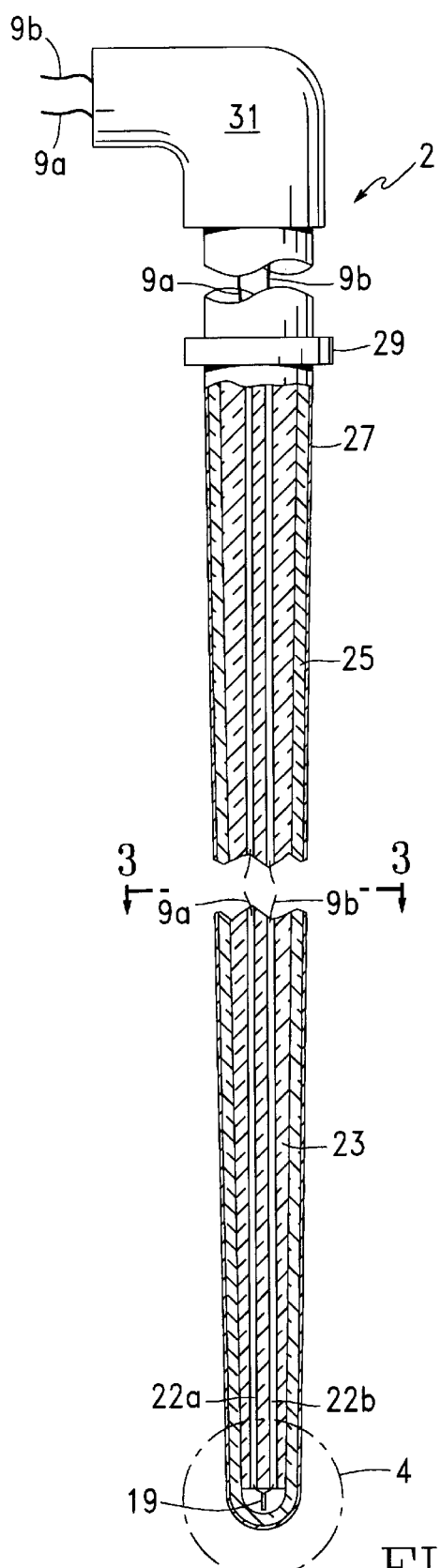
FIG. 2 is a cross-sectional side view of the thermocouple probe used in the system illustrated in FIG. 1.
Figure 3:
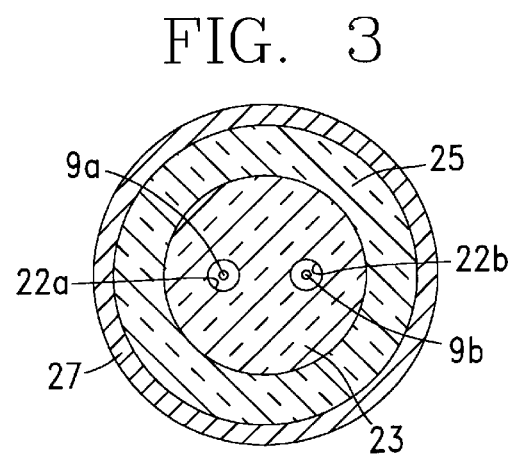
FIG. 3 is a plan cross-section view of the probe illustrated in FIG. 2 across the line 3—3.
Figure 4:
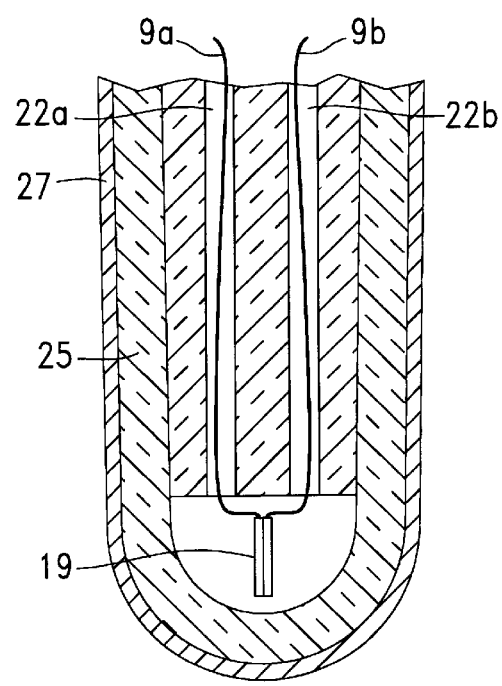
FIG. 4 is an enlarged view of the distal end of the thermocouple probe illustrated in FIG. 2.

With reference now to FIGS. 2, 3, and 4, the thermocouple probe 2 used in the system 1 includes a welded junction 19 between a platinum wire 9a and a rhodium wire 9b. As is schematically indicated in FIG. 1, wires 9a,b are ultimately connected to the input of the temperature indicator 11 by way of a shielded cable 10. When the junction 19 of the probe 2 is exposed to elevated temperatures, a thermally-induced electromotive force is generated between the wire 9a,b on the order of a few millivolts. As the magnitude of the EMF is directly proportional to the elevated temperature, the thermocouple probe 1 is capable of taking accurate temperature readings at the 2000–3000° F. temperatures associated with steel casting.

The wires 9a,b of the probe 2 are disposed within a pair of parallel bores 22a,b present in an insulative rod 23 that runs substantially the entire length of the probe 2. Rod 23 is preferably formed from a heat resistant ceramic material, such as alumina. Rod 23 is disposed within a tubular alumina sheath 25. Alumina sheath 25 is in turn surrounded by an outer sheath 27 formed from molybdenum, a metal having excellent thermal shock properties. The proximal end of the output molybdenum sheath 27 terminates in a collar 29 typically formed from carbon steel. When collar 29 abuts the ceramic jacket 3, the system operator knows that the probe 2 has been completely inserted into the jacket 3. The proximal end of the probe 1 terminates in an elbow joint 31 filled with a heat and electrically insulating ceramic material that protects the wires 9a,b and prevents them from shorting out against one another. The ends of the platinum-rhodium wires 9a,b of the probe 2 are connected to the previously-mentioned shielded signal cable 10 which in turn is connected to the input of the temperature indicator 11.

While the millivolt signal generated by the thermocouple probe 2 can begin to significantly diverge from an accurate temperature indicating signal due to the aging of the thermocouple (and consequent long term platinum-rhodium diffusion at the junction 19). The most common cause of such divergence is the inadvertent bending of the rod-like body of the probe 2 after being withdrawn from the protective ceramic jacket 3 incident to the taking of a temperature reading. Under such circumstances, the elongated body of the probe 2 will have been heated to a temperature in excess of 2500° F. from the surrounding molten steel 5. Due to the ductility of molybdenum at temperatures about 1850° F., and the highly elongated shape of the body of the probe 2, it becomes a very easy matter for the system operator to accidently bend the probe 2 by bumping the end of the probe 2 against, for example, the tundish. Such bending can cause the insulating alumina rod 23 to crack in the vicinity of the bend. Through electrochemical processes not entirely understood by the applicants, the platinum-rhodium wires 9a,b develop compounds in the vicinity of the fracture in the rod 23 which generate a thermoelectric potential opposite in polarity to the millivolt potential caused by the dissimilarity of the metals forming the wires 9a,b. As a result, the probe 2 generates a lower millivolt potential which is mistakenly interpreted by both the temperature indicator 11 and microprocessor 13 as an erroneously lower temperature for the molten steel 5. Worse yet, the negative thermoelectric potential generated by the platinum rhodium wires 9a,b in the vicinity of the fracture tend to increase fairly rapidly over time until the temperature readings generated by the probe 2 become sufficiently distorted to seriously jeopardize the quality of the steel being fabricated. Even if the system operator bends the elongated body of the probe 2 back into its original linear shape after such an inadvertent bending has occurred, all of the accuracy destroying affects resulting from the fracture of the insulator rod 23 still occur.

Figure 5:
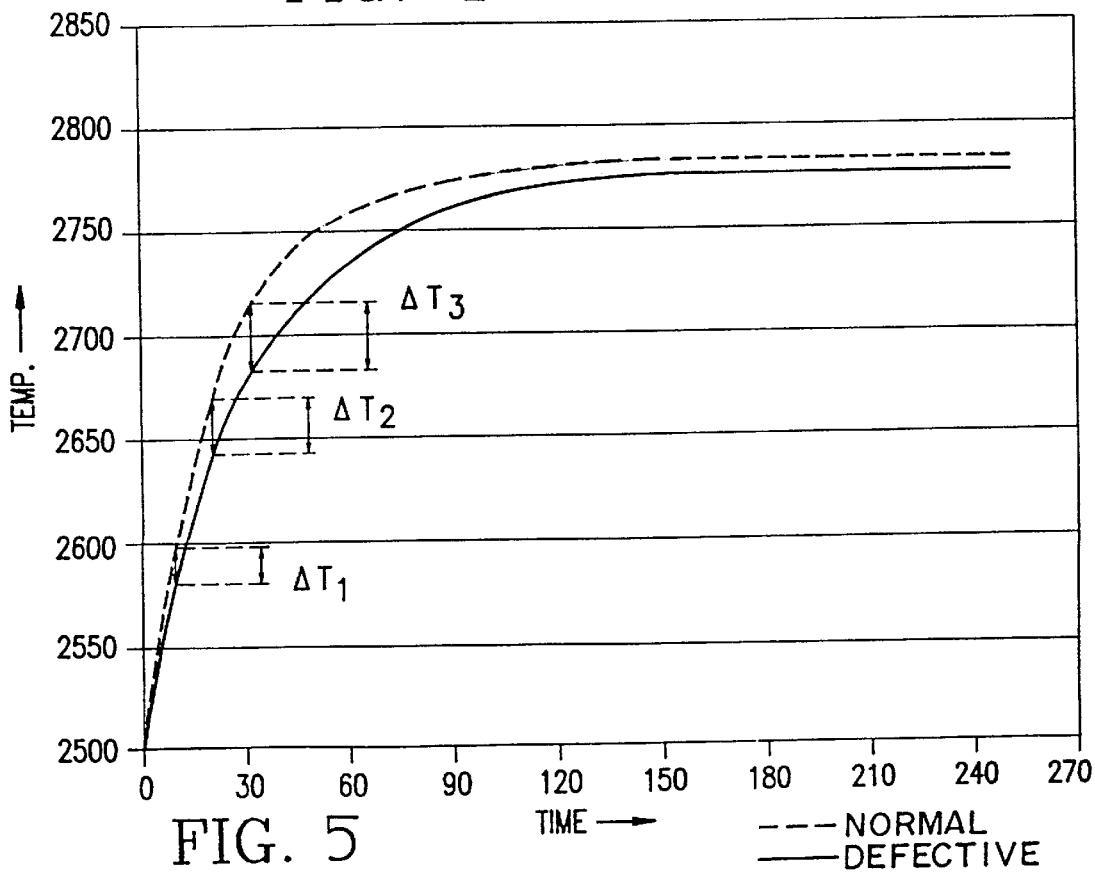
FIG. 5 is a graph of a temperature versus time plot for thermocouples operating in both a normal mode (dotted line) and defective mode (solid line)

FIG. 5 illustrates one of the principles that the method of the invention is based upon. In the case of thermocouple probes 2 which are calibrated to read the final temperatures of molten steel (which range between about 2700° F. to 2900° F.), the inventors have observed that the lag time necessary for the probe 2 to achieve thermal equilibrium with the molten steel 5 after its distal end is inserted into the protective tube 3 begins to significantly diverge between a properly functioning (dotted line) and defectively functioning (solid line) probe 2 in the last 300° of temperature readings. Specifically, after only 10 seconds past the time that a normal probe (whose output is indicated by a solid line) and a defective probe (whose output is indicated by a dotted line) have both registered a temperature of 2500° F. in route to a final temperature of approximately 2800° F., a divergence or $\Delta T_1$ of about 10° F. is already evident. After only 20 seconds, an even larger $\Delta T_2$ of approximately 38° F. is evident between the two curves. Finally, after only 30 seconds past the near simultaneous reading of 2500° F., a $\Delta T_3$ of approximately 42° F. is present between the two curves. When both the functional and defective probes achieve thermal equilibrium, the reading of the defective probe is approximately 6° F. under the accurate reading of approximately 2785° F. of the operational probe. It is the applicants' observation of the substantial differences in lag times (otherwise referred to as "rate of change of temperature" in this application) of the probe temperature readings after 2500° F. that inspired the method of the invention.

Figure 6:
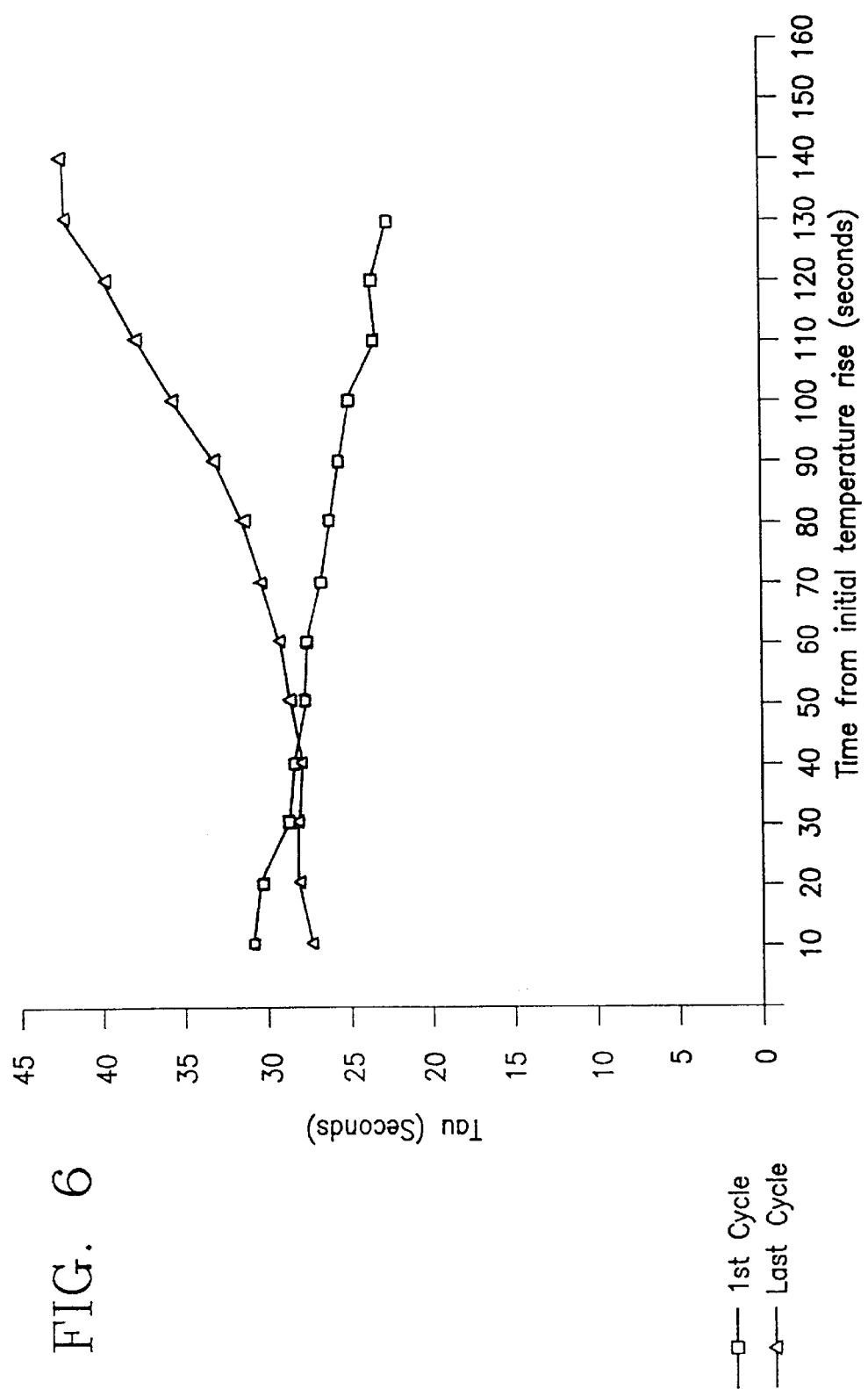
FIG. 6 is a graph illustrating the difference in the incremental $\tau$ value for the same probe from the first time it is used to measure the temperature of molten steel (indicated by squares) to the last time (indicated by triangles).

The lag time or rate of change of temperature readings as a probe 2 approaches thermal equilibrium with molten steel may be expressed as the variable $\tau$ which may be computed from the expression $$T = T_1 - (T_1 - T_0)e^{-t/\tau}$$

where T equals the temperature displayed by the probe t seconds after the temperature of a medium surrounding the probe changes from an ambient temperature $T_0$ to a temperature $T_1$ between about 2500° F. and 2850° F. For accurately functioning probes, the applicants have found that the incremental value of $\tau$ diminishes or stays constant as the probe approaches a final thermal equilibrium temperature of approximately 2850° F. from an intermediate temperature of 2500° F. However, in the case of a probe which is beginning to operate defectively, the applicants have found that the value of $\tau$ increases significantly after 2500° F. FIG. 6 illustrates such divergence in slope. In the time period between zero and 40 seconds, both the operational probe (whose output is indicated by the squares) and the output of a the same probe beginning to malfunction (whose output is indicated by triangles) roughly converge. However, after 40 seconds, after an intermediate temperature of approximately 2500° F. has been read by the probe, the $\tau$ values rapidly diverge until the $\tau$ of the probe when properly functioning is only about half the value of the $\tau$ of the same probe beginning to malfunction only 90 seconds after $\tau$ convergence was reached. Note in particular how, when the probe is operating properly, the $\tau$ values diminish slightly over time from a maximum value of approximately 28 to a lower value of approximately 22 in the time period between 40 and 130 seconds). By contrast, the $\tau$ value of the same probe beginning to malfunction increases from a minimum value of approximately 28 after 40 seconds has expired to a maximum of approximately 43 after a total of only 140 seconds has expired.

The method of the invention is based upon the observations that the lag time or rate of change of temperature reading diverges rapidly in the last 300 or 400° F. of temperature readings between operational and defective probes (as is illustrated in FIG. 5) and that the $\tau$ value decreases after about 40 seconds for an operational probe, but increases after this time period for a defective probe. In the preferred method of the invention, the value of $\tau$ is computed at least every 30 seconds and preferably every 10 seconds after an intermediate temperature of approximately 2500° F. has been read by the probe 2. Such computations may easily be performed by the microprocessor 13 of the previously-described thermocouple system 1. The microprocessor 13 then plots the values obtained for $\tau$ over time, and then computes the value of the slope of the resulting curve. If the slope of the curve is less than or equal to one, then the microprocessor 13 provides a visual indication on its screen 15 that the probe is reliable. However, if the slope of the resulting curve is greater than one, then the microprocessor 13 provides a visual indication on its screen 15 that the probe is unreliable.

In an application of the method of the invention, the microprocessor 13 can simply store the $\tau$ values obtained and compare these initial values from a probe in its first cycle of measuring temperatures in a heat of steel to the values of $\tau$ obtained in every subsequent cycle. As soon as any significant divergence in $\tau$ values occurs above an intermediate temperature reading of about 2500° F., the microprocessor 13 generates a visual signal on its screen 15 indicating that the output of the probe is no longer accurate.

In the apparatus of the invention, the microprocessor 13 is, of course, programmed with software for implementing the previously-described method.

While this invention has been described with respect to a preferred embodiment, various modifications, additions, and revisions to the invention will become evident to persons of skill in the art. All such modifications, variations, and additions are included within the scope of this invention, which is limited only by the claims appended hereto.

What is claimed:

1. A method for testing the accuracy of a temperature probe exposed to a medium having a temperature of between about 2200° F. and 3400° F., comprising the steps of measuring the rate of change of the temperature readings of the probe after a temperature of at least 2000° F. is read, comparing the measured rate of change with a standard rate of change obtained from a properly operating probe, and declaring the temperature probe to be inaccurate whenever the rate of change deviates significantly from the standard rate of change.

2. The method for testing the accuracy of a temperature probe as defined in claim 1, wherein said rate of change of the temperature readings is measured from at least about the last 400° F. of an expected final temperature reading.

3. The method for testing the accuracy of a temperature probe as defined in claim 2, wherein said rate of change of the temperature readings is measured from about the last 300° F. of an expected final temperature reading.

4. The method for testing the accuracy of a temperature probe as defined in claim 1, wherein said rate of change of temperature readings is measured after a temperature of about 2300° F. is read.

5. The method for testing the accuracy of a temperature probe as defined in claim 1, wherein said medium is liquid steel, and said rate of change of the temperature readings is measured after a temperature of about 2500° F. is read.

6. The method for testing the accuracy of a temperature probe as defined in claim 1, wherein said medium is liquid metal, and said probe includes a thermocouple encased in a ceramic jacket.

7. The method for testing the accuracy of a temperature probe as defined in claim 1, wherein the rate of change of said temperature readings is measured by periodically computing the value of $\tau$ from the following expression:

$$\tau = t/(ln((T_1-T_0)/(T_1-T)))$$

where T equals the temperature displayed by the probe t seconds after the temperature of a medium surrounding the probe changes from an ambient temperature $T_0$ to a temperature $T_1$ between about 2200° F. and 3400° F. of said medium.

8. The method for testing the accuracy of a temperature probe as defined in claim 7, wherein the value of $\tau$ is computed at least every 30 seconds after $T \geq 2000°$ F.

9. The method for testing the accuracy of a temperature probe as defined in claim 7, wherein the temperature of the medium is between about 2700° F. and 3000° F., and wherein the value of $\tau$ is computed at least every 30 seconds after T=2500° F.

10. The method for testing the accuracy of a temperature probe as defined in claim 7 further comprising the steps of determining whether the value of $\tau$ diminishes or increases over time, and declaring unreliable a probe having increasing values of $\tau$ over time.

11. A method for testing the accuracy of a thermocouple probe exposed to liquid metal having a temperature of between about 2200° F. and 3400° F., comprising the steps of:

measuring the rate of change of the temperature readings of the probe after a temperature of at least 2000° F. is read, and comparing the measured rate of change with a standard rate of change obtained from a properly operating probe.

12. The method for testing the accuracy of a thermocouple probe as defined in claim 11, wherein said rate of change is measured after the probe reads a temperature of between 2000° F. and 2500° F.

13. The method for testing the accuracy of a thermocouple probe as defined in claim 11, wherein said rate of change of the temperature readings is measured from about the last 400° F., from an expected final temperature reading.

14. The method for testing the accuracy of a thermocouple probe as defined in claim 11, wherein said rate of change of said temperature readings is measured by periodically computing the value of $\tau$ from the following expression:

$$\tau = t/(ln((T_1-T_0)/(T_1-T)))$$

wherein T equals the temperature displayed by the probe t seconds after the probe has been taken from an ambient temperature $T_0$ to immersion in said liquid metal at a temperature $T_1$ at a temperature between about 2600° F. and 3100° F.

15. The method for testing the accuracy of a thermocouple probe as defined in claim 14, wherein the value of $\tau$ is computed at least every 30 seconds after T equals 2500° F.

16. A system for testing the accuracy of a temperature probe exposed to a medium having a temperature of between about 2200° F. and 3400° F., comprising:

a temperature probe, and means for measuring the rate of change of temperature readings of the probe after said probe reads a temperature of at least 2000° F.;

comparing the measured rate of change with a standard rate of change obtained from a properly operating probe, wherein the rate of change is determined by periodically computing a value of $\tau$ from the following expression:

$$\tau = t/(ln((T_1-T_0)/(T_1-T)))$$

where T equals the temperature displayed by the probe t seconds after displaying a temperature of $T_0$ when immersed in a medium of a temperature $T_1$; and declaring the temperature probe to be inaccurate whenever the rate of change deviates significantly from the standard rate of change.

17. The system for testing the accuracy of a temperature probe as defined in claim 16, wherein said means for measuring and comparing includes the combination of microprocessor means and a timing circuit.

18. The system for testing the accuracy of a temperature probe as defined in claim 17, wherein $T_0$ is at least 2200° F.

19. The system for testing the accuracy of a temperature probe as defined in claim 17, wherein said microprocessor means includes a means for generating comparative graphs of said rate of change of the temperature readings of the probe being tested and said standard rate of change.

20. The system for testing the accuracy of a temperature probe as defined in claim 16, wherein said temperature probe is a thermocouple contained within a ceramic jacket.

* * * * *